United States Patent

[11] 3,601,799

[72] Inventors Ronald J. Martone Cheshire; Peter G. Mueller, Guilford; Homer M. Bailey, North Haven, all of, Conn.

[21] Appl. No. 836,915
[22] Filed June 26, 1969
[45] Patented Aug. 24, 1971
[73] Assignee Picker Corporation White Plains, N.Y.

[54] DIGITAL RECORDING-PLAYBACK TECHNIQUE
8 Claims, 1 Drawing Fig.

[52] U.S. Cl. ........ 340/146.1, 340/174.1 B
[51] Int. Cl. ........ G06f 11/00, G11c 29/00
[50] Field of Search ........ 340/146.1, 174.1 B; 178/69; 179/15 AL, 15 BS; 235/153

[56] References Cited

UNITED STATES PATENTS

| | | | |
|---|---|---|---|
| 2,944,248 | 7/1960 | Auerbach et al. | 340/146.1 X |
| 3,245,040 | 4/1966 | Burdett et al. | 340/146.1 X |

*Primary Examiner*—Malcolm A. Morrison
*Assistant Examiner*—Charles E. Atkinson
*Attorney*—Watts, Hoffmann, Fisher & Heinke

ABSTRACT: In a digital recording-playback technique, a ring counter is utilized in playback mode to insure that bits have not been dropped or spurious noise signals recorded. If the correct number of signals have been recorded in a word preceding a synchronizing signal, signals are obtained from two adjacent stages of the ring counter that permit the synchronizing signal to open a transfer gate from a shift register to a display register. If the correct number of signals has not been received, transfer is inhibited.

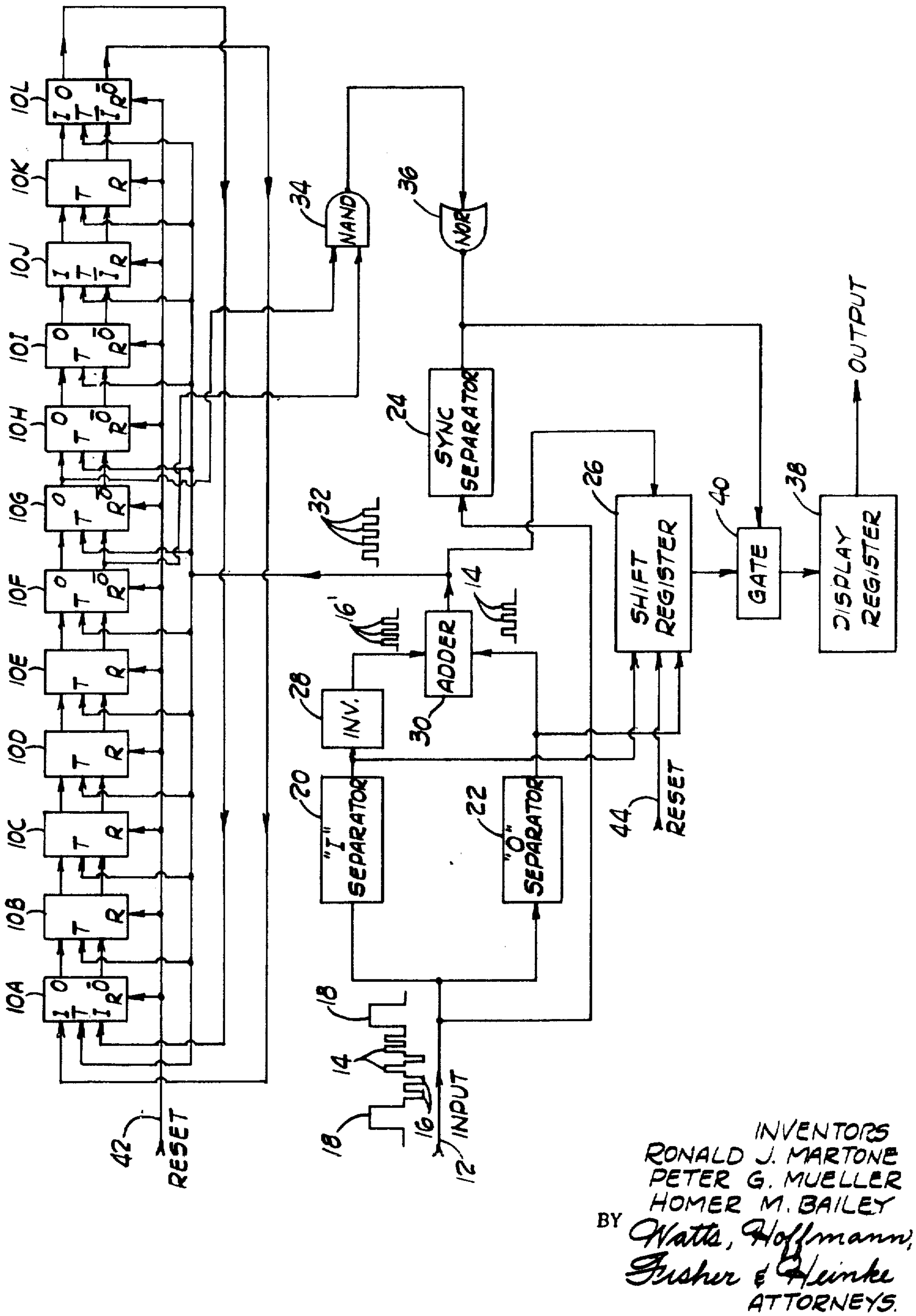
INVENTORS
RONALD J. MARTONE
PETER G. MUELLER
HOMER M. BAILEY
BY Watts, Hoffmann, Fisher & Heinke
ATTORNEYS

DIGITAL RECORDING-PLAYBACK TECHNIQUE

BACKGROUND OF THE INVENTION

1. Field of the Invention

This invention relates to digital recording-playback techniques, and more particularly to a technique for determining whether or not a predetermined number of bits have been recorded in a digital word.

2. Discussion of the Prior Art

In one method of binary recording on a magnetic medium, a recorded "1" bit causes magnetization of the recording medium in one direction, and a recorded "0" bit causes magnetization in the opposite direction. In a so-called "return-to-zero" method, there is a return to the zero magnetization state between each recorded bit. When such a recording is played back, recorded "1" and "0" signals respectively appear as pulse output signals of opposite polarities.

One of the problems encountered in this type of recording is that, if a long sequence of successive digits of the same value is recorded, the recorded signal amplitude may remain relatively constant during those periods corresponding to the digits that are not near the beginning or end of the sequence. This gives rise to the possibility of dropping certain digits when the recording is played back. In addition, the analysis of recorded digits or bits involves a form of differentiation. As the interval between any two signals decreases (in the case of closely spaced signals), greater amplification of the signals is required. Thus, the effect of spurious or stray noise pulses become greater as the delay interval is decreased and a true differentiated signal is approached.

The return-to-zero method of recording and its advantages and disadvantages are well explained in a book by R. K. Richards entitled "Digital Computer Components and Circuits" published by D. Van Nostrand Company, Inc., 1957, pp. 321–328.

In some recording and playback applications, it is exceedingly important that a word in which more than one bit has been dropped in recording or more than one extra bit has been recorded due to spurious noise signals be ignored and not played back for display or readout purposes. This cannot be accomplished by use of a recorded parity bit according to conventional techniques. A parity bit presence or absence in a word indicates only that an odd or even number of bits has been recorded, and does not give any indication of the number of bits recorded.

Accordingly, a general object of the invention is to provide a system wherein transfer from a shift register to a display register of a multibit played back word is permitted only if the word contains a particular predetermined number of bits.

SUMMARY OF THE INVENTION

A pulse train comprising a series of positive-going and negative-going pulses representing recorded bits of a digital word followed by a synchronizing (synch) pulse are separated. The bits comprising the word are sent to a shift register and are also sent to a ring counter. When a synch pulse is detected, the bits are transferred in response thereto through a gate from the shift register to a display register, but the transfer occurs only if a predetermined number of bits have been counted in the ring counter. Otherwise, the synch signal is prevented from opening the gate to transfer the bits to the display register.

BRIEF DESCRIPTION OF THE DRAWING

The single FIGURE of the drawing is a block and logic diagram of a system embodying the invention.

DESCRIPTION OF A PREFERRED EMBODIMENT

One of the important components of apparatus embodying the invention is a "twisted" ring counter 10, which is shown as having 12 stages 10A–10L. Although the counter 10 is shown as having 12 stages, the invention is not limited to any particular number of stages. In fact, all 12 stages are used twice only in a recording mode of operation wherein their outputs can provide up to 24 various timing signals. In the particular example chosen for illustration, it is desired to know whether or not a recorded digital word contains 18 binary bits preceding a synch signal. Therefore, six of the 12 counter stages are utilized twice and the remaining six are utilized once.

Ring counters are well known in the art. Essentially, they comprise a chain of binary circuits or stages, in which the first stage is coupled to the second, the second to the third and so on, with the last stage coupled back to the first. In such a counter, each binary stage receives a triggering signal directly from an external triggering source. The coupling between the binary stages is not for the purpose of triggering successive stages, but rather is for the purpose of favoring or "priming" only one binary stage so that it alone will respond to the triggering signal. At any given time, only one stage of a ring counter is in a given stage and all other stages are in an opposite state. With each successive trigger, the given state moves to the following binary stage. Ring counters are described in detail in a book entitled "Pulse, Digital and Switching Waveforms" by Millman and Taub, McGraw-Hill Book Company, 1965, Section 18–11 and the bibliography references therein.

The present invention embodies a so-called "twisted" ring counter in which there is a twist in the connections between the last and first stages. Therefore, although only 12 stages are provided, the counter 10 is capable of counting up to 24 input bits before it resets itself to its original or zero count condition. If the input bits are all of the same polarity, that is, either positive-going or negative-going, the inputs and outputs of the binary stages will assume certain conditions in response to the receipt of a predetermined number of pulses. Each stage 10A–10L of the ring counter 10 has four inputs and two outputs. The four inputs are denoted as reset signal inputs R, conditioning signal inputs $\bar{I}$ and I, trigger signal inputs T, and signal outputs O and $\bar{O}$. A trigger input signal must be received by the stage 10A before its output signals change state to enable the stage 10B to receive and operate on the next trigger input signal. The same action occurs down through the chain of 12 stages. By the time 18 input pulses have been received, they have advanced the counter once around plus six counts so that the O output of the stage 10F is positive and the $\bar{O}$ output of the stage 10G is positive. This condition can occur only when 18 pulses or a multiple thereof have been counted.

Recorded input pulses representing binary bits of digital information are supplied to the apparatus on an input lead 12, which is connected to playback apparatus (not shown). The pulse train provided on the input lead 12 comprises a plurality of positive-going pulses 14 and negative-going pulses 16 along with positive-going synchronizing (synch) pulses 18 of greater amplitude than the pulses 14. Although only six pulses 14, 16 are shown, it is understood that in the specific example chosen for illustration 18 such pulses are presumed to be provided. They synchronizing pulse 18 appears after the 18th pulse in each recorded pulse train.

The input pulses 14, 16, 18 are supplied from the lead 12 to three separators. A "1" separator 20 eliminates the "0" indicating pulses and the synch pulses, a "0" separator 22 eliminates the "1" indicating pulses and the synch pulses, and a synch separator 24 eliminates all pulses except the synch pulses 18. The separators 20, 22, 24 may comprise conventional well-known discriminator circuits.

In the illustrated example, the "0" bits are positive-going. Therefore, the "1" separator 20 (discriminator) is adjusted to respond only to negative-going pulses, each of which indicates a recorded "1" bit, and provide negative-going output pulses. The "0" input separator 22 is also a discriminator, but it is set to respond only to positive-going pulses within a predetermined amplitude range that indicate a recorded "0," and provide positive-going output pulses. Similarly, the synch separator 24 is a discriminator that is adjusted to respond only to positive-going pulses of amplitude greater than those of the "0" bit pulses, and provide positive-going output pulses. The three separators 20, 22, 24 may also be thought of as pulse height analyzers of the "window" type in which a signal must have a particular polarity and an amplitude lying within a predetermined range to be passes by the analyzer. One such analyzer is described in application Ser. No. 739,793, filed June 25, 1968 by Peter G. Mueller.

The output signals from the "1" separator 20 and the "0" separator 22 are also provided to a conventional shift register 26 which receives the pulses in serial form and stores them. This is conventional and well known in the computer art.

The negative-going output pulses from the "1" separator 20 are also provided to an inverter 28 which inverts them to provide a positive-going train of pulses 16'. Those positive-going pulses 16' from the inverted 28 are supplied along with the train of positive-going pulses 14 from the "0" separator 22 to an adder 30. The output of the adder 30 consists of a train of all positive-going pulses 32 which is supplied to the trigger inputs T of all of the stages of the ring counter 10 and as clock pulses to the shift register 26.

If the recording and playback have been correct, the pulse train 32 will consist of 18 positive-going pulses followed by a positive-going synch pulse. If there are 18 such positive pulses, and no spurious noise signals have been recorded or any bits dropped in the recording or playback process, the $\bar{0}$ output of the counter stage 10F will be positive at that time and the O output of the stage 10G will be similarly positive. The signals from the $\bar{O}$ output of the stage 10F and the O output of the stage 10G are provided to two inputs of a NAND gate 34. If both of the inputs to the NAND gate are positive, the gate 34 will provide a negative output signal. This is provided as an input to a NOR gate 36 which serves merely as an inverter. As is well known, the NAND gate 34 followed by the NOR gate 36 are equivalent to an AND gate.

It is quite common in computer operations when digital signals have been supplied to a shift register, such as the register 26, to transfer them in parallel form to an output register, such as a display register 38. In order for this transfer to be controlled, a transfer gate 40 is provided. In normal operation, if 18 recorded bits have been recorded in the counter 10, a positive-going synch signal from the synch separator 24 and a positive enabling signal from the NOR gate 36 open the transfer gate 40. However, if either more or less than 18 bits have been received by the ring counter 10, the negative output signal of the NOR gate 36 effectively grounds the positive output signal from synch separator 24 and maintains the gate 40 closed.

At the end of a synch signal received in the input pulse train or after the contents of the register 26 have been transferred to the register 38, a reset signal is provided on a lead 42 to reset the ring counter 10 to its original or "0" count condition. The reset signal is provided from the usual timing and control mechanism of the computer in which the present invention is embodied. This reset signal is necessary because the counter will (in all probability) not have counted to "24" and so will not have reset itself.

It is now apparent that for a transfer of data to occur between the shift register 26 and the display register 38, exactly 18 binary bits must be stored in the shift register. Otherwise the gate 40 will not open and the information recorded in the shift register 26 will be ignored. It is also apparent that if the data is not shifted from the shift register 26 through the gate 40 to the display register 38, the shift register 26 must be reset. This is accomplished by the provision of a reset signal on a lead 44, which may be the same reset signal that is supplied to the counter 10.

We claim:

1. In a return-to-zero type of digital playback apparatus having a shift register for storing a first train of positive-going and negative-going sets of pulses received from a recording medium in series form followed by a synchronizing pulse, an output register, and gating means for transferring data stored in said shift register to said output register in parallel form in response to said synchronizing signal, the improvement comprising:

a. separator means for separating said positive-going, negative-going and synchronizing pulses;
b. inverting means connected to said separator means for inverting signals of one polarity developed by said separator means;
c. adding means connected to said separator means and to said inverting means for providing a second train of pulses all of one polarity and equal in number of pulses to the sum of said positive-going and negative-going pulses;
d. counter means connected to receive said second train of pulses and for providing a plurality of output signals each indicative of said number of pulses; and
e. logic means responsive to at least one of said output signals to open said gating means when a selected one of said plurality of output signals is received substantially in coincidence with said synchronizing signal.

2. The apparatus of claim 1, wherein said counter means is a ring counter.

3. The apparatus of claim 1, wherein said logic means comprises an AND gate.

4. The apparatus of claim 1, wherein said counter means is a ring counter, and said logic means comprises an NAND gate.

5. The apparatus of claim 1, wherein said counter means is a ring counter, and said logic means comprises NAND gate followed by a NOR gate.

6. In a digital recording-playback apparatus having storage means for storing a train of pulse signals comprised of a plurality of binary "1" and binary "0" pulse signals received from a recording medium in series form, followed by a synchronizing pulse; an output register; and gating means for transferring data stored in said storage means to said output register in parallel form in response to the receipt of a said synchronizing signal; the improvement comprising:

a. first separator circuit means connected to receive said train of binary "1" and binary "0" pulse signals for, upon the receipt of a plurality of binary "1" pulse signals, developing a corresponding number of first output pulse signals;
b. second separator circuit means connected to receive said train of binary "1" and binary "0" pulse signals for, upon the receipt of a plurality of binary "0" pulse signals, developing a corresponding number of second output pulse signals,
c. adding circuit means connected to receive said first and second output pulse signals for providing a train of control pulse signals corresponding in number to the sum of said first and second output pulse signals;
d. counter means connected to receive said train of control pulse signals for developing an actuator signal upon the receipt of a predetermined number of control pulse signals; and,
e. logic means responsive to said output signal developed by said counter means to actuate said gating means when said actuator signal is received substantially in coincidence with a said synchronizing signal.

7. An apparatus as defined in claim 6 wherein said storage means includes a shift register; and, inverting circuit means connected to said first separator circuit means for inverting said first output pulse signals so that said first and second signals are of the same polarity.

8. An apparatus as defined in claim 7 wherein said counter means includes a shift register for developing a plurality of actuator signals each indicative of a different predetermined number of control pulse signals, and logic means including circuit means for actuating said gating means when a selected one of said plurality of signals is received substantially in coincidence with a said synchronizing signal.